United States Patent [19]

Hack

[11] 4,303,951

[45] Dec. 1, 1981

[54] DEVICE FOR COMPENSATING UNEQUAL WRITE FIELDS IN MAGNETIC DATA-STORAGE DEVICES, ESPECIALLY IN DISC MEMORIES

[75] Inventor: Joachim Hack, Ludwigshafen, Fed. Rep. of Germany

[73] Assignee: BASF Aktiengesellschaft, Ludwigshafen, Fed. Rep. of Germany

[21] Appl. No.: 52,946

[22] Filed: Jun. 28, 1979

[30] Foreign Application Priority Data

Jul. 26, 1978 [DE] Fed. Rep. of Germany ....... 2832719

[51] Int. Cl.³ ............................................... G11B 5/09
[52] U.S. Cl. ...................................... 360/46; 360/61; 360/124
[58] Field of Search ............... 360/45, 46, 61, 124, 360/68, 62

[56] References Cited

U.S. PATENT DOCUMENTS

| | | | |
|---|---|---|---|
| 3,092,817 | 6/1963 | Piament | 360/62 |
| 3,503,059 | 3/1970 | Ambrico | 360/45 |
| 3,665,485 | 5/1972 | Pear, Jr. | 360/45 |
| 3,838,448 | 9/1974 | Garde et al. | 360/45 |
| 4,021,853 | 5/1977 | Murphy | 360/45 |
| 4,037,258 | 7/1977 | Chari | 360/61 |

OTHER PUBLICATIONS

"Bit Displacement Compensation For High-Density Recording" by W. R. Hahs, IBM TDB, vol. 14 #11, 4/72.

*Primary Examiner*—Vincent P. Canney
*Attorney, Agent, or Firm*—Keil & Witherspoon

[57] ABSTRACT

A device for compensating for an inequality between the d.c. magnetic fields set up by the two oppositely acting windings, respectively, of the magnetic heads of a data storage device, particularly a disc memory, and a data storage apparatus including such a device, the device comprising means for generating a compensating direct current and feeding this current at the appropriate time to a predetermined one of the two windings of the magnetic heads. The magnitude of the compensating direct current is advantageously adjusted in dependence on the instantaneous magnitude of the write current.

7 Claims, 4 Drawing Figures

DEVICE FOR COMPENSATING UNEQUAL WRITE FIELDS IN MAGNETIC DATA-STORAGE DEVICES, ESPECIALLY IN DISC MEMORIES

The invention relates to an arrangement in magnetic data-storage apparatus, especially disc memories, for compensating for an inequality between the write fields set up in the two oppositely acting windings of a write head, such inequalities being caused by the heads themselves or an erasing device in the vicinity of the write heads.

In data storage systems such inequalities cause, on read-out, peak shift and thus digitized signals with varying time spacings therebetween.

These faults are caused by (a) non-symmetrical structure or non-symmetrical winding of the write/read head, (b) the action of stray magnetic fields from the erase head onto the write head, especially in magnetic disc memories with tunnel erase devices, and (c) d.c. magnetization of the head.

Physically, owing to causes (a) to (c) above, a small d.c. magnetic field component is superimposed upon the write field which is not of ideal square wave shape. This causes the effective flux reversal on the storage medium to be shifted in time relative to the write field, depending upon the direction of the d.c. field. The result is pulse spacings in the read signal whose width depends upon the direction of the written flux reversals field. This effect is undesirable and particularly so in the case of MFM recording (modified-frequency recording) with increased information density.

An object of the present invention is to eliminate the abovementioned defects using simple means.

This object is achieved according to the invention by a compensating arrangement of the kind mentioned above which comprises circuit means which are controlled by the electric command signals for supplying a compensating current to a predetermined one of the two write windings.

Thus, in accordance with the invention, a compensating magnetic field which counteracts the unbalance or the interference field is used to eliminate the unbalance or interference. Specifically, the unwanted field is compensated by means of a compensating direct current which is fed to one of the write head windings and the amplitude of which is small relative to the alternating write current, the compensating current advantageously being supplied only at times when the unbalance or interference occurs.

In an advantageous embodiment of the invention, the magnitude of the compensating current is adjustable, especially by means of resistors which are switched in and out of circuit together with the write head or the erase head.

According to another aspect, the invention resides in a magnetic data-storage apparatus and especially a disc memory, of the above type and including a compensating arrangement of the kind set forth above.

In a data storage apparatus according to the invention, write and read errors are far rarer than in other stores, so that more economic operation is possible.

Since the interference field caused by the erase device does not coincide with the non-symmetrical write field caused by the write head, it is expedient to control appropriate compensating currents with control commands "write data", "write enable", "erase", "drive select", "write current (high-low)", which are customary in a data store of this type, as can be gathered from the following description.

The invention will now be described, by way of example, with reference to the accompanying drawings, in which FIG. 1 is a block diagram of a control system of a magnetic disc drive with a circuit according to the invention;

Figure 1:
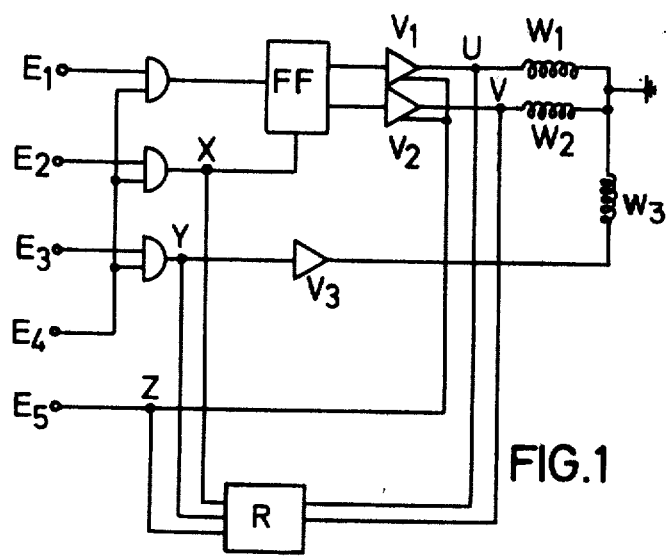

At the input terminals E1–E5 shown in FIG. 1, control signals of the control unit (not shown) provided in common for several magnetic disc drives are available. The individual signals at the terminal E1 are the write data, at E2 a write enable signal, at E3 an erase signal, at E4 a drive select signal, and at E5 a write current magnitude control signal (e.g. write current normally high, with switch over to low current).

When a drive has been selected (i.e. the signal at E4 is high level), the write data are transmitted from the terminal E1, via a flip flop FF, to write amplifiers $V_1$ and $V_2$ if the write head is also switched on (i.e. a positive signal appears on E2). Flip flop FF generates pulses which cause $V_1$ and $V_2$ to selectively energize the oppositely acting windings $W_1$ and $W_2$ of the head under the control of the write data. The command "Erase" (i.e. a positive signal on E3) causes current to flow through an erase winding $W_3$ via an erase amplifier $V_3$, to erase residual recordings from previous write operations on the disc on either side of the track just written. The write amplifiers $V_1$ and $V_2$ are controlled via the input terminal E5. The write current is thus adjustable to two discrete amplitude levels, according to the information density to be written, since in the case of flexible magnetic discs, the information density increases with decreasing track length.

At terminals X, Y and Z behind the terminals E2, E3 and E5, respectively, a resistor network R is connected. The connection from E2 and E3 is via AND gates. The outputs of the network R are connected to the outputs of the write amplifiers $V_1$ and $V_2$ (at terminals U and V) and thus to the windings $W_1$ and $W_2$ of the write head. The network R generates a flow of current through the winding $W_1$ or $W_2$ of the write head, which is dependent on the time sequence of the signals applied at E1 to E5.

The field compensation by means of the network R (which is illustrated in detail in FIG. 2) functions as follows:

In the "Write" state, a positive signal (e.g. 5 V) is applied to the input E2 and if a signal is present at E4, also to X. The desired compensation current, its magnitude being determined by a resistor $R_1$, passes through one of the head windings $W_1$ or $W_2$, depending upon the position fixed for a given write head, of switches $S_1$ and $S_2$, and counteracts in an asymmetrical manner the field produced in the write head by the write data. If a low write current is indicated at the terminal Z by a signal absent from E5 with a signal present at E4, no current passes through diode $D_1$ and resistor $R_2$ and hence no increase of the compensating current determined by $R_1$ takes place.

More particularly, when, as is normally the case, a signal is present at terminal $E_5$, amplifiers $V_1$ and $V_2$ are conditioned for a high level amplification over the direct control connection from $E_5$ to these amplifiers, shown in FIG. 1. Thus, when a write enable signal is present at $E_2$ and simultaneously a drive select signal at $E_4$, a compensating current is supplied via X and resistor $R_1$ to one or the other head winding $W_1$ or $W_2$ as determined by the position of switches $S_1, S_2$, and, owing to the signal at $E_5$, in parallel thereto additional compensating current is fed to this winding from $E_5$, via Z, diode $D_1$ and resistor $R_2$. Thus, the head winding in question receives a high compensating current. On the other hand, if, as an indication of a low write current command, a signal is absent from terminal $E_5$ and hence from the aforementioned direct control connection, amplifiers $V_1, V_2$ are conditioned for low write current and, furthermore, the above additional compensating current via Z, $D_1$ and $R_2$ is not supplied so that the compensating current is limited to the value fed through X and $R_1$.

The required values of the resistors $R_1$ and $R_2$ are determined for each head according to its own non-symmetrical write current, by an appropriate head measurement, e.g. by compensation in a bridge circuit. The value of the resistor $R_1$ is advantageously determined for minimum peak shift or minimum data jitter, without the tunnel erase device being switched on. In the case of flexible magnetic discs, the erase command is not synchronized with the write command, owing to the spatial separation of the write gap and the erase gap. Therefore, additional compensation of the erase interference field by means of another current, determined by the resistor $R_3$, is required during the erase period (i.e. a positive signal on E3). The value of $R_3$ may be determined, in addition to $R_1$, likewise for minimum peak shift and data jitter, as indicated above. The normal position of the switches $S_1$ and $S_2$ via which a properly timed compensating current is applied to one of the windings, depends on the polarity of the interference field and has to be determined individually by measurement. The normal position of the switches remains unchanged for one and the same write head; it need only be varied when a head is replaced.

Figure 2:
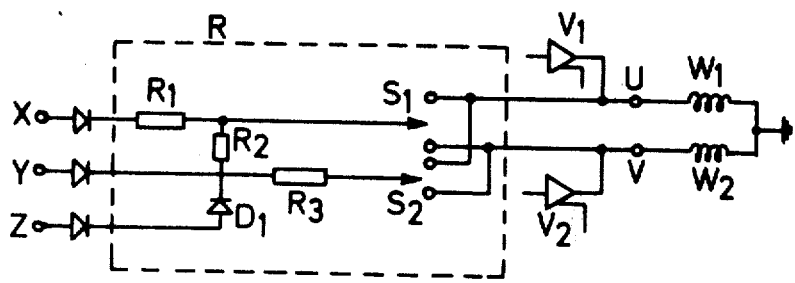
FIG. 2 shows the basic structure of the circuit in FIG. 1.

The above-described circuit can in principle be employed for all heads or head combinations comprising at least two windings, the two windings in the present case, indicated at $W_1$ and $W_2$, being formed by a center gap as shown in FIGS. 1 and 2.

Up to now it has been assumed that a low-level compensation is provided for a low write current amplitude. Coupling to the write current switching terminal E5 is of course only required when the compensating resistors depend on the current amplitude to a substantial degree.

Figure 3A:
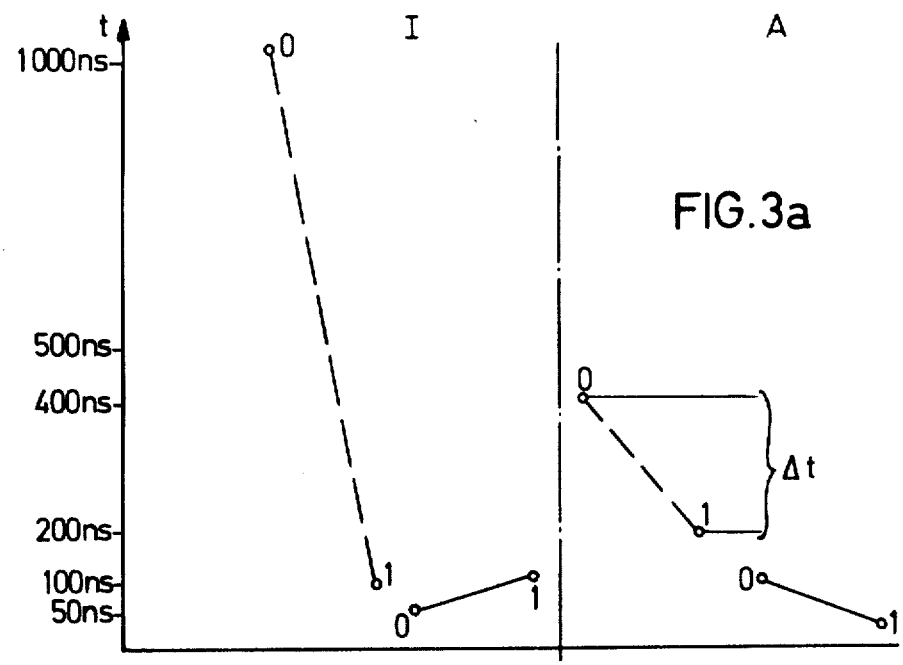
FIGS. 3a and 3b are test curves plotted with the circuit of FIG. 1.

In FIG. 3a the data jitter, measured on a magnetic disc, is shown for the inner track (left-hand region I) and for the outer track (right-hand region A) and for the signal patterns 0 and 1, written in FM recording with compensation (indicated by a solid line) and without compensation (dotted line). A reduction in jitter and in jitter difference between pattern '0' and '1' can be read off for the different tracks:

Inner track (I): A reduction in jitter difference of 900 ns, compared with 50 ns (corresponding to an 18-fold improvement)

Outer track (A): A reduction in jitter difference of 200 ns, compared with 20 ns (corresponding to a 10-fold improvement).

Figure 3B:
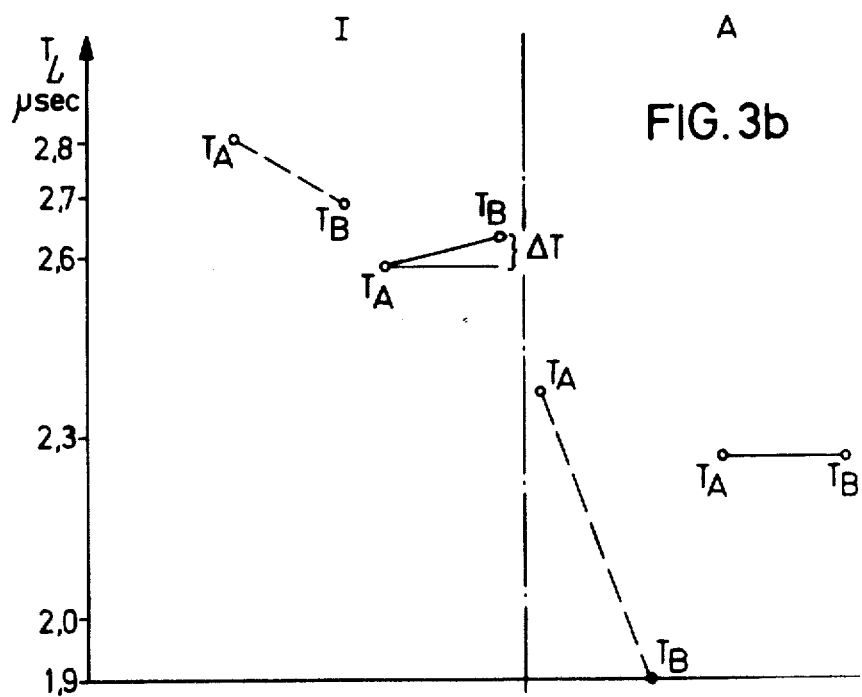

FIG. 3b shows peak shift results obtained under the same test conditions in the case of a 0110110110 flux reversal pattern at a nominal distance of 2 $\mu$s between the "1" flux reversals. At $T_B$, the polarity of the current passing through the write head was inverted relative to $T_A$.

Inner track (I): A reduction of peak shift difference from 0.12 to 0.05 $\mu$s

Outer track (A): A reduction of peak shift difference from 0.5 $\mu$s to 0.0 $\mu$s.

A small peak shift and jitter difference are requirements for proper and error free data recording.

The compensation was carried out with a resistor $R_1$ of 5 k$\Omega$ and a compensating current of approximately 0.8 ma.

The compensation of interference fields caused by erasure was accomplished with resistors of 1 to 20 k$\Omega$. It was found that the prior history of the head and, also, the type of erasing device play an important part and determine whether the compensating resistor $R_3$ is situated in the upper or the lower region of the indicated range of resistance.

I claim:

1. In a magnetic data storage apparatus, including a magnetic write head having two oppositely acting windings, a magnetic erase head and connections for receiving a plurality of electric command signals selectively rendering said heads effective,
   an arrangement for compensating for an inequality between the magnetic fields set up by said two windings, respectively, said arrangement comprising:
      switching means for preselecting one of said windings in accordance with the sense of said imbalance, and
      circuit means controlled by said command signals for supplying a compensating direct current to the winding preselected by said switching means while said write head is rendered effective.

2. In a magnetic data storage apparatus an arrangement as claimed in claim 1,
   wherein said inequality is due to an unbalance in the magnetic structure or in the windings of said write head, and
   wherein said circuit means include means controlled by the write command signal for supplying a compensating direct current tending to restore the balance, to a predetermined one of said windings while said head is rendered effective.

3. In a magnetic data storage apparatus an arrangement as claimed in claim 1,
   wherein said inequality is due to a D.C. magnetic stray field picked up by said write head from said erase head, said erase head being disposed in the vicinity of said write head, and
   wherein said circuit means include means controlled by the erase command signal for supplying a compensating direct current counteracting said stray field to a predetermined one of said windings while said erase head is rendered effective.

4. In a magnetic data storage apparatus an arrangement as claimed in claim 1, 2 or 3,
   wherein said arrangement includes means for automatically adjusting the magnitude of the compensating direct current in accordance with the magnitude of the write current used.

5. In a magnetic data storage apparatus an arrangement as claimed in claim 4,
wherein said connections include one over which a command signal controlling the magnitude of a write current is received, and
wherein said adjusting means include circuit elements controlled by the last-mentioned command signal for automatically varying the magnitude of said compensating direct current in accordance with the magnitude of the write current used.

6. In a magnetic data storage apparatus an arrangement as claimed in claim 1, 2 or 3,
wherein said arrangement includes a network comprising resistors and diode means, which at its input side is connected to the command signal connections and on its output side to the two write windings.

7. A disc memory type magnetic data storage apparatus, including a magnetic write head having two oppositely acting windings, a magnetic erase head in the vicinity of said write head, connections for receiving a plurality of command signals selectively rendering said heads effective, and
an arrangement for compensating for an inequality between the magnetic fields set up by said two windings, respectively, said arrangement comprising:
switching means for preselecting one of said windings in accordance with the sense of said imbalance, and
circuit means controlled by said command signals for supplying a compensating direct current to the winding preselected by said switching means while said write head is rendered effective.

* * * * *